United States Patent
Cho et al.

(10) Patent No.: US 9,514,225 B2
(45) Date of Patent: Dec. 6, 2016

(54) VIDEO RECORDING APPARATUS SUPPORTING SMART SEARCH AND SMART SEARCH METHOD PERFORMED USING VIDEO RECORDING APPARATUS

(71) Applicant: Hanwha Techwin Co., Ltd., Changwon-si (KR)

(72) Inventors: SungBong Cho, Changwon-si (KR); Hanki Choi, Changwon-si (KR); Jinsu Im, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/823,180

(22) Filed: Aug. 11, 2015

(65) Prior Publication Data

US 2016/0162497 A1 Jun. 9, 2016

(30) Foreign Application Priority Data

Dec. 5, 2014 (KR) .......................... 10-2014-0174254

(51) Int. Cl.
*H04N 9/80* (2006.01)
*G06F 17/30* (2006.01)
*G06K 9/00* (2006.01)
*G11B 27/22* (2006.01)

(52) U.S. Cl.
CPC ..... *G06F 17/3079* (2013.01); *G06F 17/30802* (2013.01); *G06K 9/00744* (2013.01); *G06K 9/00771* (2013.01); *G11B 27/22* (2013.01)

(58) Field of Classification Search
CPC .................... G06F 17/3079; G06F 17/30802; G06K 9/00718; G06K 9/00744; G06K 9/00771; G11B 27/22
USPC ................ 386/241, 239, 318, 300, 353, 351
See application file for complete search history.

(56) References Cited

U.S. PATENT DOCUMENTS

| 2006/0159370 | A1* | 7/2006 | Tanaka | G06K 9/4652 382/305 |
| 2009/0002517 | A1* | 1/2009 | Yokomitsu | G06K 9/00771 348/223.1 |

FOREIGN PATENT DOCUMENTS

| JP | 2007-300456 A | 11/2007 |
| KR | 2000-0047363 A | 7/2000 |
| KR | 10-2005-0024134 A | 3/2005 |
| KR | 10-2012-0014463 A | 2/2012 |
| KR | 10-2013-0032856 A | 4/2013 |

* cited by examiner

Primary Examiner — Robert Chevalier
(74) Attorney, Agent, or Firm — Sughrue Mion, PLLC

(57) ABSTRACT

A video recording apparatus includes: an object classifier configured to classify an object which is included in an input video and related to a detected event, according to a type of the object; an object color extractor configured to extract a representative color of the object; and a search color storage configured to transform the representative color into a search color and store the search color as color information to be used for searching the object or the detected event from the input video.

20 Claims, 14 Drawing Sheets

VEHICLE - YELLOW (T0)

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 |
| 0 | 0 | 1 | 1 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

VEHICLE - YELLOW (T1)

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 2 | 2 | 2 | 0 | 0 | 0 | 0 | 0 | 0 | 0 | 0 | 0 | 0 | 0 | 0 | 0 |
| 2 | 2 | 2 | 0 | 0 | 0 | 0 | 0 | 0 | 0 | 0 | 0 | 0 | 0 | 0 | 0 |
| 0 | 0 | 2 | 2 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 4B

VEHICLE - GREEN

| 0 | 0 | 1 | 1 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 1 | 1 | 0 | 0 | 0 | 0 | 0 | 0 | 0 | 0 | 0 | 0 | 0 |
| 0 | 0 | 1 | 1 | 1 | 0 | 0 | 0 | 0 | 0 | 0 | 0 | 0 | 0 | 0 | 0 |
| 0 | 0 | 0 | 1 | 1 | 1 | 1 | 0 | 0 | 0 | 0 | 0 | 0 | 0 | 0 | 0 |
| 0 | 0 | 0 | 0 | 0 | 1 | 1 | 1 | 0 | 0 | 0 | 0 | 0 | 0 | 0 | 0 |
| 0 | 0 | 0 | 0 | 0 | 0 | 1 | 1 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 4C

VEHICLE - WHITE

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 1 | 1 | 1 | 0 | 0 | 0 | 0 |
| 0 | 0 | 0 | 0 | 0 | 0 | 0 | 0 | 0 | 1 | 1 | 1 | 0 | 0 | 0 | 0 |
| 0 | 0 | 0 | 0 | 0 | 0 | 0 | 0 | 0 | 1 | 1 | 1 | 0 | 0 | 0 | 0 |

FIG. 4D

PERSON - RED

| 0 | 0 | 0 | 0 | 0 | 0 | 0 | 0 | 0 | 0 | 0 | 1 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 4E

PERSON - BLUE

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

VIDEO RECORDING APPARATUS SUPPORTING SMART SEARCH AND SMART SEARCH METHOD PERFORMED USING VIDEO RECORDING APPARATUS

CROSS-REFERENCE TO THE RELATED APPLICATION

This application claims priority from Korean Patent Application No. 10-2014-0174254, filed on Dec. 5, 2014, in the Korean Intellectual Property Office, the disclosure of which is incorporated herein in its entirety by reference.

BACKGROUND

1. Field

Apparatuses and methods consistent with exemplary embodiments relate to a video recording apparatus capable of supporting a search based on metadata information such as color, information, etc. of an object.

2. Description of the Related Art

Although videos captured by a closed-circuit television (CCTV) are very helpful to prevent crimes, detect suspects, identify accident culprits, etc., it is not easy to find a video related to a particular accident from recorded videos. Furthermore, it is difficult for only one person to thoroughly monitor in real time all videos transmitted from a plurality of CCTVs.

Also, when motion detection is performed by a video recording apparatus according to the related art, even repetitive meaningless motions such as wavering of leaves in a tree are recorded as events. That is, since information regarding undesired events is erroneously detected, the amount of information to be searched for is large and detecting a desired event is difficult.

SUMMARY

Exemplary embodiments of the inventive concept are directed to a function of extracting color information regarding an area of a received input video in which an event occurred and using the color information for search for the event or an object related to the event.

The exemplary embodiments are directed to analyzing a pattern of an object for which an event is detected to determine whether the object is a human, a vehicle, or an animal, and extracting a representative color as additional information regarding the object. Since the object actually includes various colors, a representative color of the object that is moving is extracted. Then, the extracted representative color is transformed into a color for search to be used for search, and records information regarding the color for search on the video recording apparatus.

Various aspects of the inventive concept will be set forth in part in the description which follows and, in part, will be apparent from the description, or may be learned by practice of the presented embodiments.

According to one or more exemplary embodiments, there is provided a video recording apparatus which may include: an object classifier configured to classify an object which is included in an input video and related to a detected event, according to a type of the object; an object color extractor configured to extract a representative color of the object; and a search color storage configured to transform the representative color into a search color and store the search color as color information to be used for searching the object or the detected event from the input video.

The video recording apparatus may further include an event information storage configured to store information about at least one of an area of the input video in which the event occurs, a time point when the event occurs, sensitivity about the event, and attribute of the object detected in the area in which the event occurs, wherein the information about the attribute comprises identification, size, and location of the object.

The video recording apparatus may support or provide a search interface configured to receive input of searching for the object or the event based on the search color.

The video recording apparatus may further include a metadata storage configured to store information about at least one of an attribute, the representative color and the search color of the object, per block of the predetermined number of blocks.

The search color storage may be configured to select, as the search color, a color of which differences between red, green and blue (RGB) values and RGB values of the representative color are minimum, among a plurality of predetermined colors.

The search color storage may be further configured to generate a data structure from the input video based on a number of blocks constituting each image frame of the input video, the type of object related to the detected event, and a number of a predetermined colors from which the search color is selected.

According to one or more exemplary embodiments, there is provided a smart search method performed by a video recording apparatus. The method may include: classifying, by an object classifier, an object which is included in an input video and related to a detected event, according to a type of the object; extracting, by an object color extractor, a representative color of the object; and transforming, by a search color storage, the representative color into a search color and storing the search color as color information to be used for searching the object or the detected event from the input video.

BRIEF DESCRIPTION OF THE DRAWINGS

These and/or other aspects will become apparent and more readily appreciated from the following description of the embodiments, taken in conjunction with the accompanying drawings in which:

FIGS. 4A to 4E illustrate a method of displaying an area in which an event of an object has occurred and color information about the object, which is performed by a video recording apparatus, according to exemplary embodiments;

DETAILED DESCRIPTION OF THE EXEMPLARY EMBODIMENTS

Figure 1:
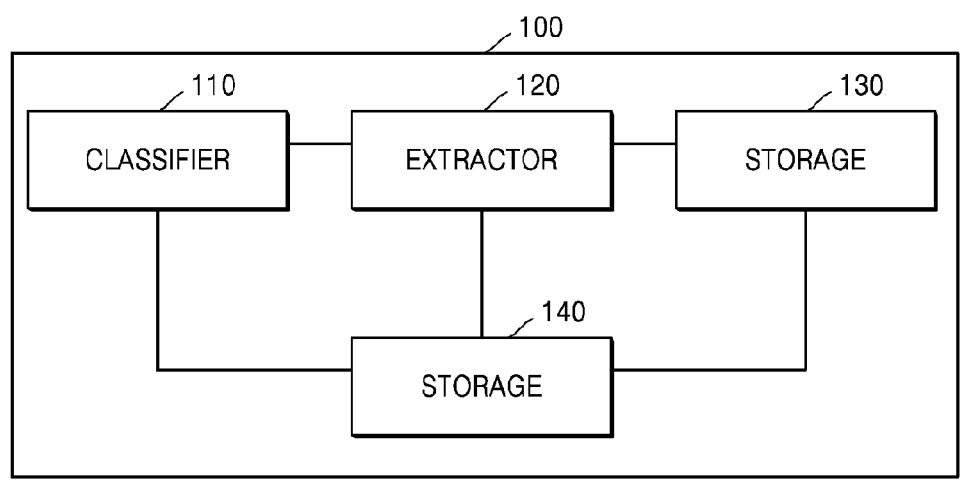
FIG. 1 is a block diagram of a video recording apparatus according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, expressions such as "at least one of," when preceding a list of elements, modify the entire list of elements and do not modify the individual elements of the list.

FIG. 1 is a block diagram of a video recording apparatus 100, according to an exemplary embodiment.

The video recording apparatus 100 includes an object classifier 110, an object color extractor 120, and a search color storage 130. The video recording apparatus 100 may further include a metadata storage 140.

According to an exemplary embodiment, the video recording apparatus 100 receives and decodes a video transmitted from a network camera, and extracts an area in which an event is detected from the decoded video. An object detected in the extracted area is classified according to whether the object is a vehicle, a human, or an animal. Also, a representative color of the detected object is extracted, and the extracted representative color is transformed into a search color and is stored.

The video recording apparatus 100 provides, supports or includes a search interface for searching for an object based on at least one of a search color and various object information. The search interface may be configured to perform a search by additionally setting at least one among a sensitivity of the event, time information regarding a time point when the event occurred, and area information regarding an area where the event occurred.

Examples of the video recording apparatus 100 include a digital video recorder (DVR), a network video recorder (NVR), a video recorder, a hand-held device, a mobile phone, a smartphone, a smart watch, a tablet personal computer (PC), etc.

According to an exemplary embodiment, the video recording apparatus 100 may establish communication with at least one among a network camera, a video processing device, a video recorder, etc. in a wired and/or wireless manner, and provide motion event information generated during processing of a received input video.

The video recording apparatus 100 may receive a video stream to be used for a video analysis, perform video processing such as decoding on the video stream, and store an input video. Then, for example, a video stream of about ten frames per second (FPS) is extracted from the stored input video, and scaled down to a size appropriate for the video analysis. The size appropriate for the video analysis may be 640×480 pixels at a ratio of 4:3, 640×350 pixels at a ratio of 16:9, etc.

The video recording apparatus 100 detects an event such as a motion from the scaled-down video on which video processing is performed as described above. In the scaled-down video, object information about an object related to a detected event includes attribute information about the object such as type, size, object identification (ID) representing whether the object newly appears in the video or has already appeared in a previous video, etc. According to an exemplary embodiment, new object ID is assigned to a newly detected object.

The object classifier 110 analyzes a pattern of an object related to a detected event in the input video received by the video recording apparatus 100. Based on the pattern of the object, the object is classified as a human, a vehicle, an animal, a tree, a thing, etc.

The object color extractor 120 extracts a representative color from the object classified by the object classifier 110. The object color extractor 120 may extract the representative color in various ways.

Figure 5:
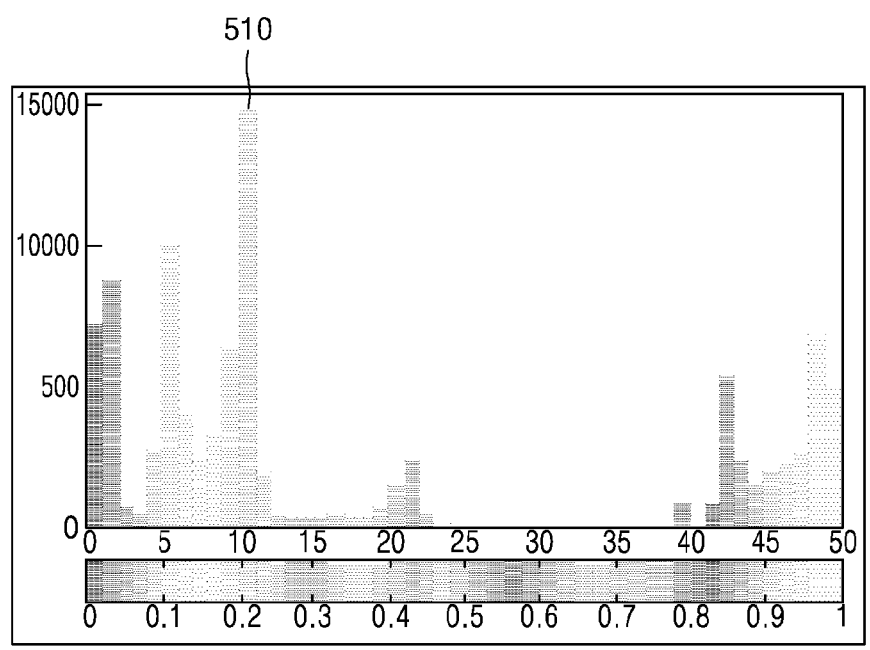
FIGS. 5 and 6 illustrate methods of extracting a representative color, which are performed by an video recording apparatus, according to exemplary embodiments.

According to an exemplary embodiment, the object color extractor 120 may use a histogram of FIG. 5 to extract the representative color. The histogram is generated based on the color of each of pixels of the detected object, and a color of a largest number of pixels (see reference numeral 510 of FIG. 5) is selected as the representative color.

According to another exemplary embodiment, the object color extractor 120 extracts the representative color based the color of a representative pixel of the detected object. In this case, the representative pixel of the detected object may be determined by selecting at least one among corner pixels of the detected object, a central pixel of the detected, and pixels spaced a predetermined distance from the center of the detected object.

In addition, a specific pixel may be selected as a representative pixel according to a user's selection. For example, the corner pixels and the central pixel of the object may be selected as representative pixels and a representative color may be extracted from the representative pixels. According to another exemplary embodiment, pixels that are present in a central region of the object and within a predetermined distance from the central region of the object may be selected as representative pixels and a representative color may be extracted from these pixels.

According to another exemplary embodiment, the object color extractor 120 may selectively use a method of extracting a representative color according to the size of the object.

According to an exemplary embodiment, the object color extractor 120 may generate a histogram of all pixels of the object and select the color of a largest number of pixels as a representative color when the size of the object is less than or equal to a predetermined size.

According to another exemplary embodiment, the object color extractor 120 may select a representative color based on the color of a representative pixel of the object or extract a representative color by using a histogram and a line sampling method when the size of the object detected in the input video is equal to or greater than the predetermined size.

Figure 6:
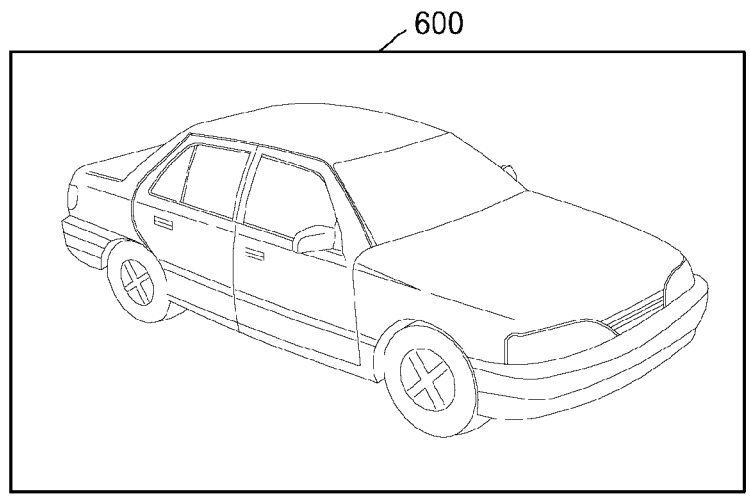
Figure 6:
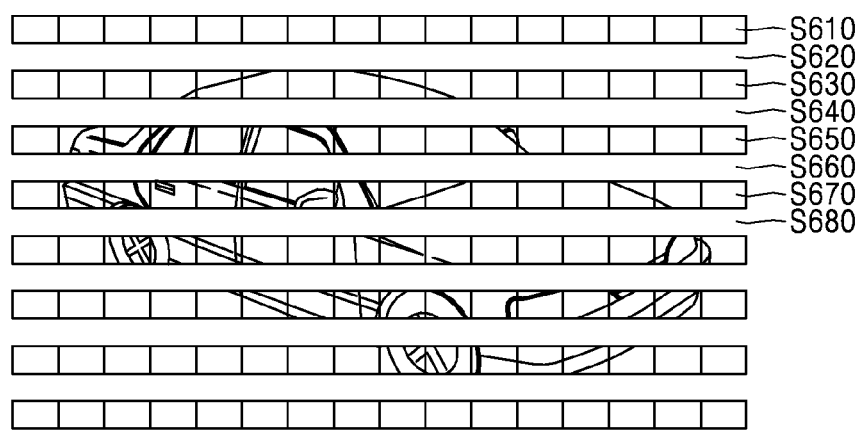

Referring to FIG. 6, the object color extractor 120 generate a histogram by sampling only lines S610, S630, and S670 among lines S610, S620, S630 . . . , S680, . . . of an input video 600 and extracts a representative color from the histogram.

According to another exemplary embodiment, the object color extractor 120 may selectively use a method of extracting a representative color according to the type of the object.

The object color extractor 120 may extract a representative color according to the line sampling method when the object is a vehicle, and extract a representative color by extracting the color of the skin of the object or the color of a top or bottom that the object wears based on the color of a representative pixel that is within a predetermined distance of the face, head, eyes, nose, mouth, or an identifiable characteristic point of the object when the object is a human.

According to an exemplary embodiment, the object color extractor 120 displays the extracted representative color with 24-bit RGB values. The 24-bit RGB values may include eight bits for red, eight bits for green, and eight bits for blue, and may be used to represent 16,581,375 (=255× 255×255) colors.

However, colors that the video recording apparatus 100 is capable of detecting are limited. Thus, according to an exemplary embodiment, the object color extractor 120 may transform the representative color displayed with the RGB values into a color closest to colors for search which are provided from the video recording apparatus 100.

Figure 7:
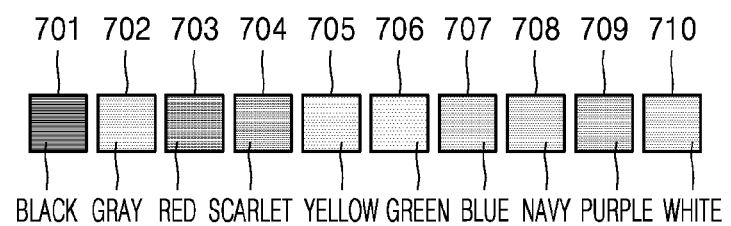
FIG. 7 is a diagram illustrating a search color table containing 10 search colors, which is used by a search color storage, according to an exemplary embodiment.

Referring to FIG. 7, the video recording apparatus 100 sets a color table to be used for a search beforehand in the search color storage 130, and uses the color table for searches.

The representative color extracted by the object color extractor 120 is transformed into one of preset colors for search, which are included in the color table. In this case, the search color storage 130 selects, as a color for search, a color of which differences between RGB values and RGB values of the representative color are minimum among colors included in the color table set beforehand in the video recording apparatus 100 (see the color table of FIG. 7), and transforms the representative color into the selected color for search.

According to an exemplary embodiment, the video recording apparatus 100 may further include the metadata storage 140 or an event information storage (not shown). The metadata storage 140 is configured to store, for example, object information and color information for search regarding an object related to a detected event associated with each other per each block of a plurality of blocks constituting an image frame of the input video.

The event information storage is configured to store at least one among area information regarding an area of the input video in which the event has occurred, time information regarding a time point when the event occurred, information regarding the sensitivity of the event, and object information regarding an object detected in the area in which the event occurred. In this case, the object information includes ID information, size information, and location information about the detected object.

Figure 2:
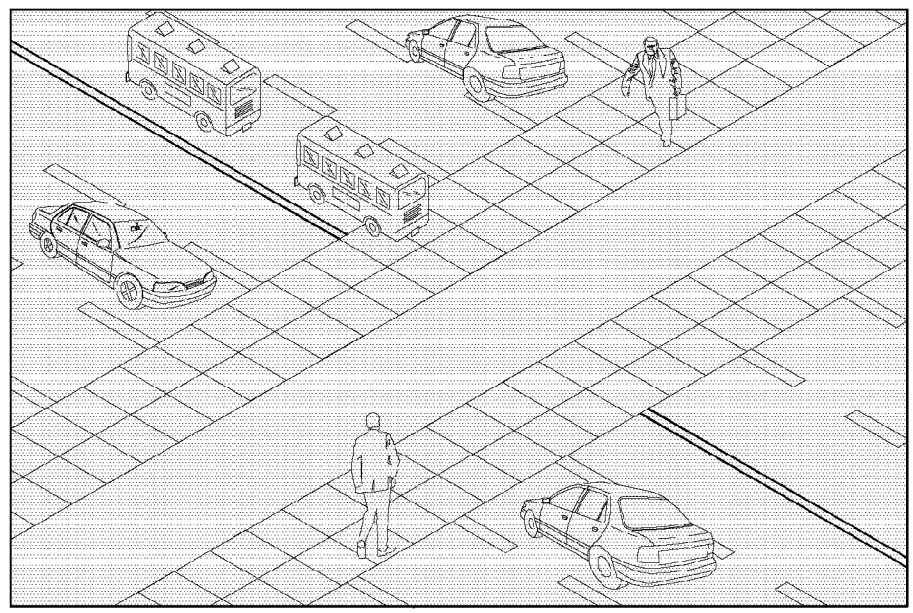
FIG. 2 illustrates an input video received by a video recording apparatus, according to an exemplary embodiment.
Figure 3:
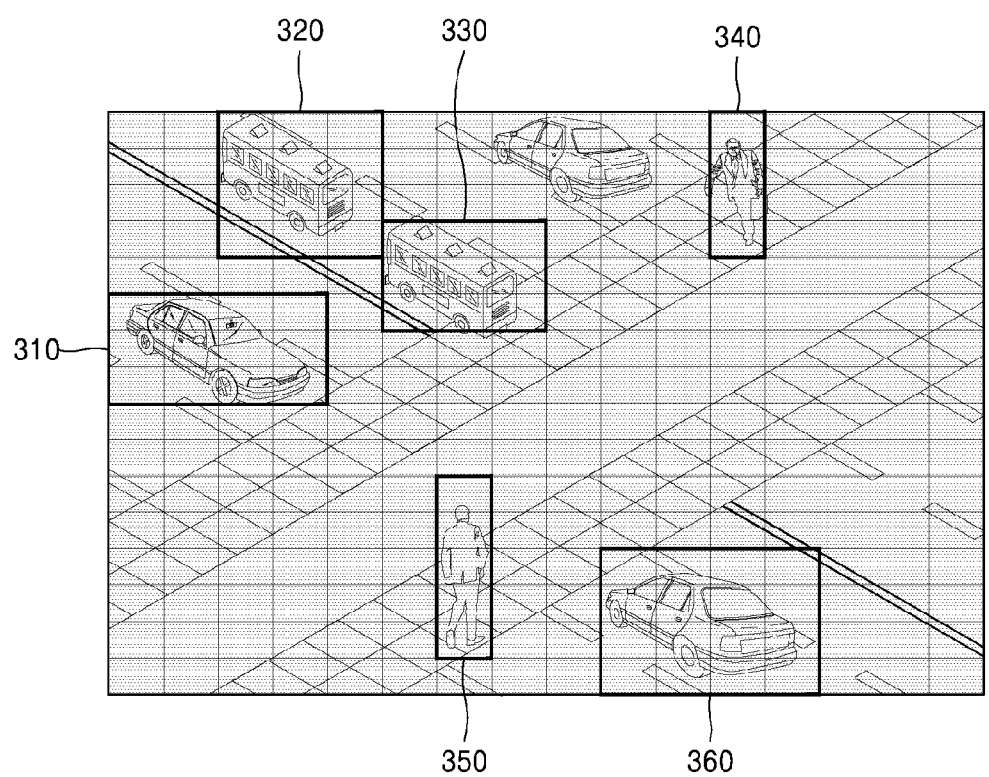
FIG. 3 illustrates events detected from an input video received by a video recording apparatus, according to an exemplary embodiment.

FIG. 2 illustrates an input video received by a video recording apparatus, according to an exemplary embodiment. FIG. 3 illustrates an event detected from an input video received by a video recording apparatus, according to an exemplary embodiment.

Referring to FIGS. 2 and 3, the video recording apparatus extracts objects 310, 320, 330, 340, 350 and 360, the motions of which are detected from the received input video. Then, the extracted objects 310, 320, 330, 340, 350 and 360 may be classified according to their types. In the exemplary embodiment of FIG. 3, the objects 340 and 350 are classified as humans and the objects 310, 320, 330, and 360 are classified as vehicles among the objects 310, 320, 330, 340, 350 and 360, the motions of which are detected in the input video.

Also, the metadata storage 140 of FIG. 1 or the event storage is configured to store ID information, size information, color information, etc. of an object, the motion of which is detected.

Referring to FIG. 3, when six moving objects are detected, the metadata storage 140 of FIG. 1 or the event storage assigns ID information to the respective detected objects.

For example, ID information ID#1 may be assigned to the object 310 which is an automobile, and stored to be associated with Left-Top:3×10 and Right-Bottom: 5×14 which are object location information about the ID information 'ID#1', Width:2 and Height:4 which are object size, and Yellow: RGB 153, 24, 81, Black: RGB 35, 36, 33 and Grey: RGB 64, 67,66 which are object color information.

A vehicle assigned the ID information 'ID#1' may have a plurality of pieces of color information. According to an exemplary embodiment, a representative color is extracted by extracting representative color information among the plurality of pieces of color information, and color information for search is extracted based on the extracted representative color. For example, a representative color of the vehicle assigned the ID information 'ID#1' may be yellow, and a color corresponding to reference numeral '705' of FIG. 7 may be extracted by transforming the representative color into a color for search.

When a vehicle assigned the ID information 'ID#1' and a motion event are detected, the metadata storage 140 stores at least one among object location information, object size information, object color information, representative color information, and color information for search to be associated with one another. Also, the metadata storage 140 may be configured to store at least one among an ID number, location information, size information, color information, representative color information, and color information for search of an object related to a detected event to be associated with one another.

FIGS. 4A to 4E illustrate a method of displaying an area in which an event of an object has occurred and color information about the object, which is performed by a video recording apparatus, according to an exemplary embodiment.

Referring to FIGS. 3 and 7, objects 310, 320, 330, 340, 350 and 360 detected in an input video received by the video recording apparatus at a point of time T1 are classified into humans (objects 340 and 350) and vehicles (objects 310, 320, 330, and 360).

It is assumed that colors provided in a search color table set beforehand in the video recording apparatus include black 701, gray 702, red 703, scarlet 704, yellow 705, green 706, blue 707, navy 708, purple 709 and white 710 as illustrated in FIG. 7. According to an exemplary embodiment, when the video recording apparatus generates an input video formed of 16×16 blocks, whether an object is present may be displayed in the blocks of the input video. Also, a color for search may be displayed in the blocks of the input video.

According to an exemplary embodiment, a video recording apparatus may have the following data structure: the number of blocks constituting an image frame of input video×the number of colors included in color-for-search table provided from video recording apparatus×the number of object types. According to an exemplary embodiment, this data structure may be generated by the search color storage 130.

For example, the number of blocks constituting an image frame of the input video may be 16×16, the number of the colors of the search color table provided from the video recording apparatus may be 10 as illustrated in the exemplary embodiment of FIG. 7, and the types of objects may be two, i.e., humans and vehicles, as described above with reference to FIG. 3.

In this case, the video recording apparatus may have a data structure of ((([16]×[16])×10×2). The video recording apparatus generates blocks displaying 10 colors including black 701, gray 702, red 703, scarlet 704, yellow 705, green 706, blue 707, navy 708, purple 709 and white 710 with respect to the objects 340 and 350 which are humans (see FIG. 3), and blocks displaying five colors including white 710, black 701, red 703, yellow 705, and blue 707 with respect to the objects 310, 320, 330, and 360 which are vehicles (see FIG. 3).

Figure 4A:

According to an exemplary embodiment, when events of yellow, green and white vehicles are detected at a point of time T0, the video recording apparatus displays frequencies of detecting colors for search on blocks corresponding to regions in which objects, that is the vehicles, are detected, and displays, as '0', information regarding the other colors for search that are not detected, as illustrated in FIGS. 4A, 4B and 4C.

Referring to FIGS. 3 and 4A, when a color for search for the object 310 which is a first vehicle detected at the point of time Time T0 is yellow, a frequency of detecting the color for search may be displayed on a block corresponding to a region in which the object 310 is detected, as illustrated in FIG. 4A. Thereafter, when yellow is detected again at the same region at a point of time Time T1, the frequency of detecting the color for search, which is displayed on the block, is changed to '2'. Here, '2' represents that two yellow vehicles were detected.

According to an exemplary embodiment, the number of events occurring in a predetermined time period $T_0$ to $T_N$ may be detected as described above. Also, a hit map may be formed based on the number of events. Also, a frequency of detecting a specific color may be searched for.

FIG. 4B illustrates an example of a data structure, corresponding to 16×16 blocks of an input frame of an input video, stored in a metadata storage of the video recording apparatus when a color for search for the object 320 which is a second vehicle and the object 330 which is a third vehicle detected at the point of time Time T0 is green.

FIG. 4C illustrates an example of a data structure, corresponding to 16×16 blocks of an input frame of an input image, stored in the metadata storage of the video recording apparatus when a color for search for the object 360 which is a fourth vehicle detected at the point of time Time T0 is white.

FIG. 4D illustrates an example of a data structure, corresponding to 16×16 blocks of an input frame of an input image, stored in the metadata storage of the video recording apparatus when a color for search for the object 340 which is a first human detected at the point of time Time T0 is red. FIG. 4E an example of a data structure, corresponding to 16×16 blocks of an input frame of an input image, stored in a metadata storage of the video recording apparatus when a color for search for the object 350 which is a second human detected at the point of time Time T0 is blue.

Figure 8:
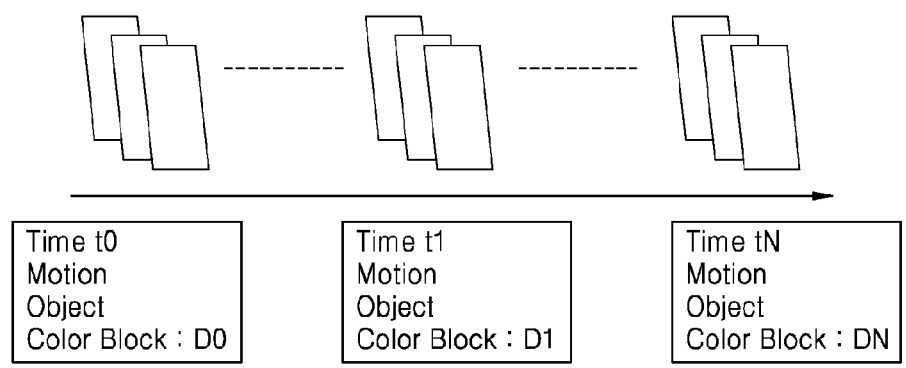
FIG. 8 is a diagram illustrating a method of storing metadata of an object related a detected event in a time period T0 to TN, according to an exemplary embodiment.
Figure 9:
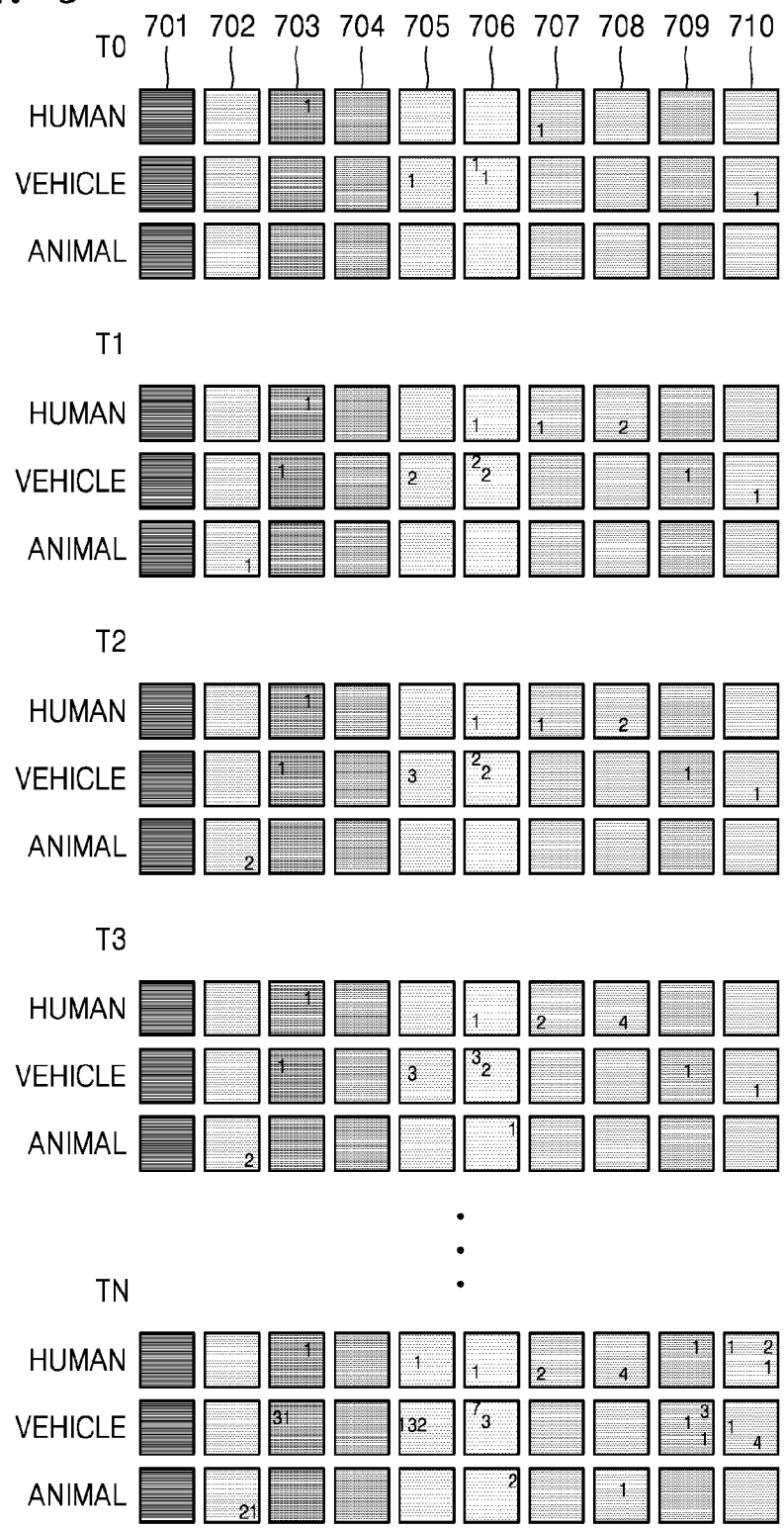
FIG. 9 is a diagram illustrating search color data included in metadata of an object related to a detected event is detected in the time period T0 to TN, according to an exemplary embodiment.

FIG. 8 is a diagram illustrating a method of storing metadata of an object related to an event detected in a time period $T_0$ to $T_N$, according to an exemplary embodiment.) FIG. 9 is a diagram illustrating color data for search included in the metadata of the object for which an event is detected in the time period $T_0$ to $T_N$, according to an exemplary embodiment.

A human detected at a point of time $T_0$ is displayed in data structures displaying a red color for search 703 and a blue color for search 707. In this case, in the data structures, location information about the human detected in an input video may be also displayed. For example, human detection locations are indicated as upper right and lower left positions, respectively, in the data structure.

Vehicles detected at the point of time $T_0$ are displayed in data structures displaying a yellow color for search 705, a green color for search 706, and a white color for search color 710. Two vehicles are detected at different positions on the data structure displaying the green color for search 706, respectively. That is, two vehicles matching the green color for search 706 are detected. Otherwise, it may be determined that one vehicle matching the green color for search 706 is detected at two positions.

The above process is repeatedly performed with respect to objects detected at points of time T1, T2, T3, ... $T_N$. At the point of time $T_N$, '132' is displayed as a frequency of detecting vehicles on a data structure displaying the yellow color for search color 705. In this case, 132 yellow vehicles are detected at a left-middle position on the data structure displaying the yellow color for search color 705 in the time period $T_0$ to $T_N$. In a time period $T_3$ to $T_N$, 129(=132−3) vehicles are detected at the left-middle position.

Figure 10:
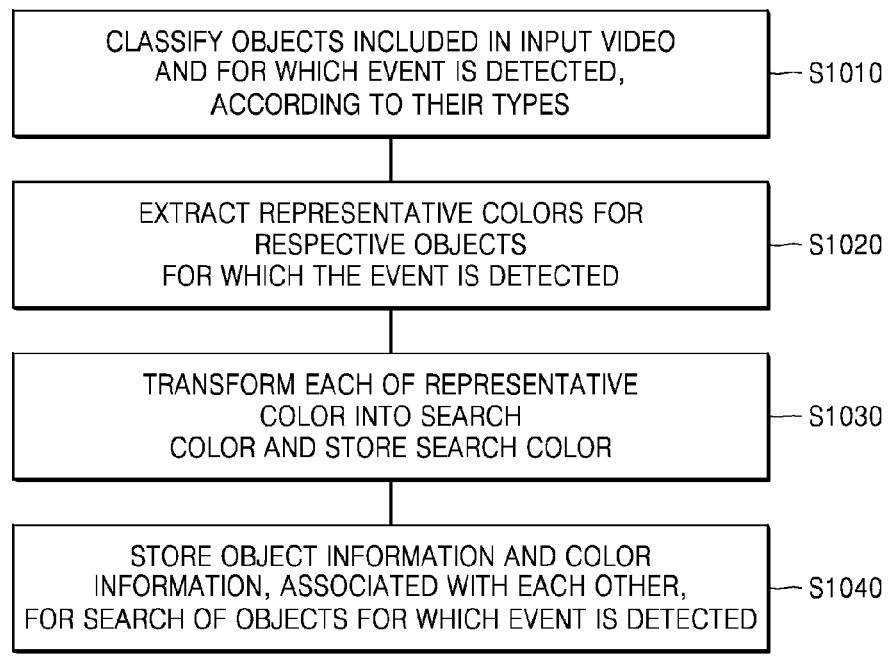
FIG. 10 is a flowchart of a smart search method performed by a video recording apparatus, according to an exemplary embodiment.

FIG. 10 is a flowchart of a smart search method performed by a video recording apparatus, according to an exemplary embodiment.

In the smart search method, an object classifier classifies objects, which are included in an input video and related to a detected event, according to their types (operation S1010). In this case, the event includes a case in which a motion is detected, a case in which a fire occurs, a case in which a dangerous thing is detected, etc.

After the object classifier classifies the objects related to the detected event, an object color extractor extracts a representative color for each of the objects related to the detected event (operation S1020). The representative color is displayed with RGB values. The representative color extracted by the object color extractor is transformed into a color for search, which is provided from the video recording apparatus (operation S1030). In this process, a metadata storage associates at least one among object information, representative color information and color information for search about the objects related to the detected event with a plurality of blocks constituting an image frame of an input image, and stores the association information (operation S1040).

As described above, according to the above exemplary embodiments, a video recording apparatus supports or provides a search function performed using metadata information about an object related to a detected event. For example, the video recording apparatus supports or provides an additional search performed by extracting color information about the object related to the detected event.

Exemplary embodiments, e.g., FIG. 10, can be embodied as processor readable code in a processor readable medium included in a mobile terminal. The processor readable medium may be any recording apparatus capable of storing data that is read by a processor, e.g., a read-only memory (ROM), a random access memory (RAM), a compact disc (CD)-ROM, a magnetic tape, a floppy disk, an optical data storage device, and so on. The processor readable medium can be distributed among computer systems that are interconnected through a network, and exemplary embodiments may be stored and implemented as processor readable code in the distributed system.

At least one of the components represented by a block as illustrated in FIG. 1 may be embodied as various numbers of hardware, software and/or firmware structures that execute respective functions described above, according to an exemplary embodiment. For example, at least one of these components may use a direct circuit structure, such as a memory, processing, logic, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Also, at least one of these components may further include a processor such as a central processing unit (CPU) that performs the respective functions, a microprocessor, or the like. Two or more of these components may be combined into one single component, element or unit which performs all operations or functions of the combined two or more components, elements of units. Also, at least part of functions of at least one of the components may be performed by another of these components. Further, although a bus is not illustrated in the above block diagrams, communication between the components, elements or units may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. A video recording apparatus comprising:
   an object classifier configured to classify an object which is included in an input video and related to a detected event, according to a type of the object;
   an object color extractor configured to extract a representative color of the object; and
   a search color storage configured to transform the representative color into a search color and store the search color as color information to be used for searching the object or the detected event from the input video.

2. The apparatus of claim 1, further comprising an event information storage configured to store information about at least one of an area of the input video in which the event occurs, a time point when the event occurs, sensitivity about the event, and attribute of the object detected in the area in which the event occurs,
   wherein the information about the attribute comprises identification, size, and location of the object.

3. The apparatus of claim 1, wherein the search color storage is configured to select, as the search color, a color of which differences between red, green and blue (RGB) values and RGB values of the representative color are minimum, among a plurality of predetermined colors.

4. The apparatus of claim 1, further comprising a search interface configured to receive input of searching for the object or the event based on the search color.

5. The apparatus of claim 4, wherein the search interface supports or provides for a search to be performed by additionally setting at least one among a sensitivity of the event, time information about a time point when the event occurs, and area information about an area in which the event occurs.

6. The apparatus of claim 1, wherein each image frame of the input video comprises a predetermined number of blocks and the event is detected by determining the object in a unit of block.

7. The apparatus of claim 6, further comprising a metadata storage configured to store information about at least one of an attribute, the representative color and the search color of the object, per block of the predetermined number of blocks.

8. The apparatus of claim 7, wherein the attribute of the object comprises the type of the object indicating whether the object is at least one of a human and a vehicle.

9. The apparatus of claim 8, wherein the search color storage is configured to select, as the search color, a color of which differences between red, green and blue (RGB) values and RGB values of the representative color are minimum, among a plurality of predetermined colors.

10. The apparatus of claim 1, wherein the representative color is extracted based on a histogram generated based on colors of some or all pixels of the object or based on a line sampled from the object.

11. The apparatus of claim 1, wherein the representative color is extracted based on a color of a representative pixel of the object, and
    wherein the representative pixel of the object comprises at least one of a corner pixel of the object, a central pixel of the object, and a pixel spaced a predetermined distance from a center of the object.

12. The apparatus of claim 1, wherein the representative color is extracted based on a histogram generated with respect to a line sampled from the object.

13. The apparatus of claim 1, wherein the search color storage is configured to select, as the search color, a color of which differences between red, green and blue (RGB) values and RGB values of the representative color are minimum, among a plurality of predetermined colors.

14. The apparatus of claim 13, wherein the search color storage is further configured to generate a data structure from the input video based on a number of blocks constituting each image frame of the input video, the type of object related to the detected event, and a number of a predetermined colors from which the search color is selected.

15. A smart search method performed by a video recording apparatus, the method comprising:
    classifying, by an object classifier, an object which is included in an input video and related to a detected event, according to a type of the object;
    extracting, by an object color extractor, a representative color of the object; and
    transforming, by a search color storage, the representative color into a search color and storing the search color as color information to be used for searching the object or the detected event from the input video.

16. The method of claim 15, further comprising selecting, as the search color, a color of which differences between red, green and blue (RGB) values and RGB values of the representative color are minimum, among a plurality of predetermined colors.

17. The method of claim 16, further comprising storing information about at least one of an attribute, the representative color and the search color of the object, per block of the predetermined number of blocks.

18. The method of claim 17, further comprising generating a data structure from the input video based on a number of blocks constituting each image frame of the input video, the type of object related to the detected event, and a number of a predetermined colors from which the search color is selected.

19. The method of claim 15, further comprising storing information about at least one of an attribute, the representative color and the search color of the object, per block of the predetermined number of blocks.

20. The method of claim 15, further comprising generating a data structure from the input video based on a number of blocks constituting each image frame of the input video, the type of object related to the detected event, and a number of a predetermined colors from which the search color is selected.

* * * * *